United States Patent
Bailey

[11] Patent Number: 6,087,943
[45] Date of Patent: Jul. 11, 2000

[54] STEERING ALERT SYSTEM

[76] Inventor: Paul Lenworth Bailey, 34 Paerdegat 4 St., Brooklyn, N.Y. 11236

[21] Appl. No.: 09/188,444

[22] Filed: Nov. 9, 1998

[51] Int. Cl.⁷ .................................................. G08B 23/00
[52] U.S. Cl. .......................... 340/576; 340/575; 340/439; 340/438; 340/309.15; 180/443; 180/444; 280/661; 280/95.1
[58] Field of Search ..................................... 340/576, 575, 340/439, 438, 309.15; 180/443, 444; 280/661, 95.1

[56] References Cited

U.S. PATENT DOCUMENTS

| | | | |
|---|---|---|---|
| 4,594,583 | 6/1986 | Seko et al. | 340/576 |
| 5,529,316 | 6/1996 | Mattila | 280/95.1 |
| 5,651,561 | 7/1997 | Tandy et al. | 280/661 |
| 5,684,462 | 11/1997 | Gold | 340/576 |
| 5,714,925 | 2/1998 | Lee et al. | 340/309.15 |
| 5,775,459 | 7/1998 | Jorg et al. | 180/444 |
| 5,836,419 | 11/1998 | Shimizu et al. | 180/443 |

*Primary Examiner*—Jeffery A. Hofsass
*Assistant Examiner*—Tai T. Nguyen

[57] ABSTRACT

An alert system for providing an alarm is disclosed. The system includes a vehicle having a steering wheel with a steering column, the steering column having an exterior surface. Marks are provided on the exterior surface of the steering column. A sensor is positioned adjacent to the marks to sense the presence and absence of marks thereadjacent as caused by the rotational movement of the steering column. At least one alarm is adapted to be energized for alerting a driver and passenger, if present, when the sensor does not sense movement of the marks and steering column and steering wheel. Electronic timers including delay switches are provided to preclude energizing the alarms if the sensor senses the movement of the steering column and marks in greater than the predetermined lapsed time.

1 Claim, 2 Drawing Sheets

STEERING ALERT SYSTEM

BACKGROUND OF THE INVENTION

1. Field of the Invention

The present invention relates to a new and improved steering alert system and, more particularly, pertains to providing an alarm for increased safety when a vehicle driver may have fallen asleep or lost attention to driving.

2. Description of the Prior Art

The use of vehicle alarm systems of known designs and configurations is known in the prior art. More specifically, vehicle alarm systems of known designs and configurations heretofore devised and utilized for the purpose of alerting a driver during unsafe conditions through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of vehicle alarm systems of known designs and configurations. By way of example, U.S. Pat. No. 5,335,176 to Nakamura, issued Aug. 2, 1994, discloses a safety system for vehicles. U.S. Pat. No. 4,728,939 to Otani, issued Mar. 1, 1988, discloses a steering wheel steering aid. U.S. Pat. No. 4,594,583 to Seko, et al., issued Jun. 10, 1986, discloses a method and system for detection of driver drowsiness by an abrupt steering change following no steering movement. U.S. Pat. No. 4,259,665 to Manning, issued Mar. 31, 1981, discloses a driver sleep or fatigue alarm. Lastly, U.S. Pat. No. 4,210,905 to Coons, issued Jul. 1, 1980, discloses an alarm for waking a dozing driver.

In this respect, the steering alert system according to the present invention substantially departs from the conventional concepts and designs of the prior art, and in doing so provides an apparatus primarily developed for the purpose of providing an alarm for increased safety when a vehicle driver may have fallen asleep or lost attention to driving.

Therefore, it can be appreciated that there exists a continuing need for a new and improved steering alert system which can be used for providing an alarm for increased safety when a vehicle driver may have fallen asleep or lost attention to driving. In this regard, the present invention substantially fulfills this need.

SUMMARY OF THE INVENTION

In view of the foregoing disadvantages inherent in the known types of vehicle alarm systems of known designs and configurations now present in the prior art, the present invention provides a new and improved steering alert system. As such, the general purpose of the present invention, which will be described subsequently in greater detail, is to provide a new and improved steering alert system and methods which have all the advantages of the prior art and none of the disadvantages.

To attain this, the present invention essentially comprises a new and improved steering alert system for providing an alarm when a vehicle driver may have fallen asleep or lost attention comprising, in combination, a vehicle having four wheels and a steering wheel with a steering column coupled therebetween, the steering column being cylindrical with a central axis of rotation and an exterior cylindrical surface; a plurality of linear marks on the exterior surface of the steering column, the marks being parallel with respect to each other and parallel with the axis of the steering column; a photo-electric sensor fixedly positioned adjacent to the marks to sense the presence and absence of marks thereadjacent as caused by the rotational movement of the steering column resulting from the rotation of the steering wheel by a driver; audio and visual alarms adapted to be energized for alerting a driver and passenger, if present, when the sensor does not sense movement of the marks and steering column and steering wheel within a predetermined lapsed time; electronic timers including delay switches to preclude energizing the alarms if the sensor senses the movement of the steering column and marks in greater than the predetermined lapsed time; an adjuster under the control of the driver to change the extent of the predetermined lapsed time in which the sensor will energize the alarm; and an on/off switch under the control of the driver to selectively activate and inactivate the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved steering alert system which has all the advantages of the prior art vehicle alarm systems of known designs and configurations and none of the disadvantages.

It is another object of the present invention to provide a new and improved steering alert system which may be easily and efficiently manufactured and marketed.

It is a further object of the present invention to provide a new and improved steering alert system which is of a durable and reliable construction.

An even further object of the present invention is to provide a new and improved steering alert system which is susceptible of a low cost of manufacture with regard to both materials and labor, and which accordingly is then susceptible of low prices of sale to the consuming public, thereby making such a steering alert system economically available to the buying public.

Even still another object of the present invention is to provide an alarm for increased safety when a vehicle driver may have fallen asleep or lost attention to driving.

Lastly, it is an object of the present invention to provide an alert system for providing an alarm. The system includes a vehicle having a steering wheel with a steering column, the steering column having an exterior surface. Marks are provided on the exterior surface of the steering column. A sensor is positioned adjacent to the marks to sense the presence and absence of marks thereadjacent as caused by the rotational movement of the steering column. At least one alarm is adapted to be energized for alerting a driver and passenger, if present, when the sensor does not sense movement of the marks and steering column and steering wheel. Electronic timers including delay switches are provided to preclude energizing the alarms if the sensor senses the movement of the steering column and marks in greater than the predetermined lapsed time.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
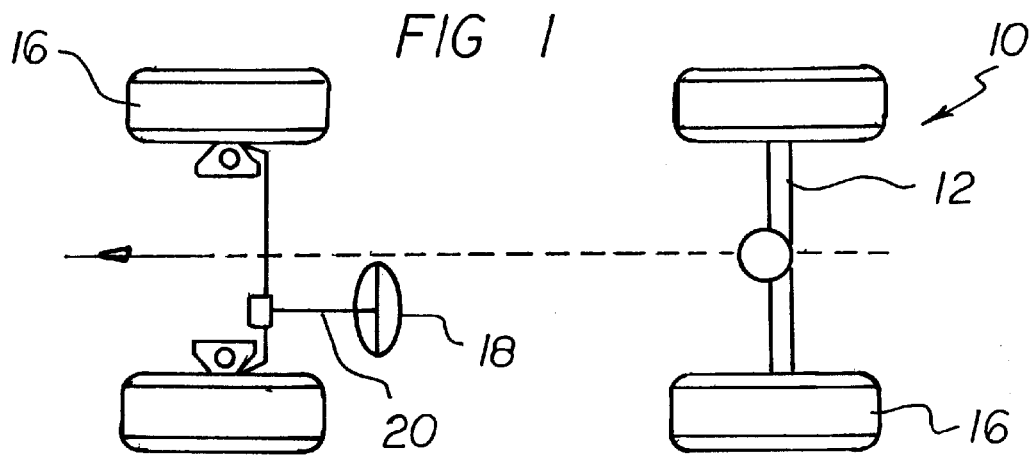
FIG. 1 is a perspective view of a vehicle employing the new and improved steering alert system for providing an alarm for increased safety when a vehicle driver may have fallen asleep or lost attention constructed in accordance with the principles of the present invention.
Figure 4:
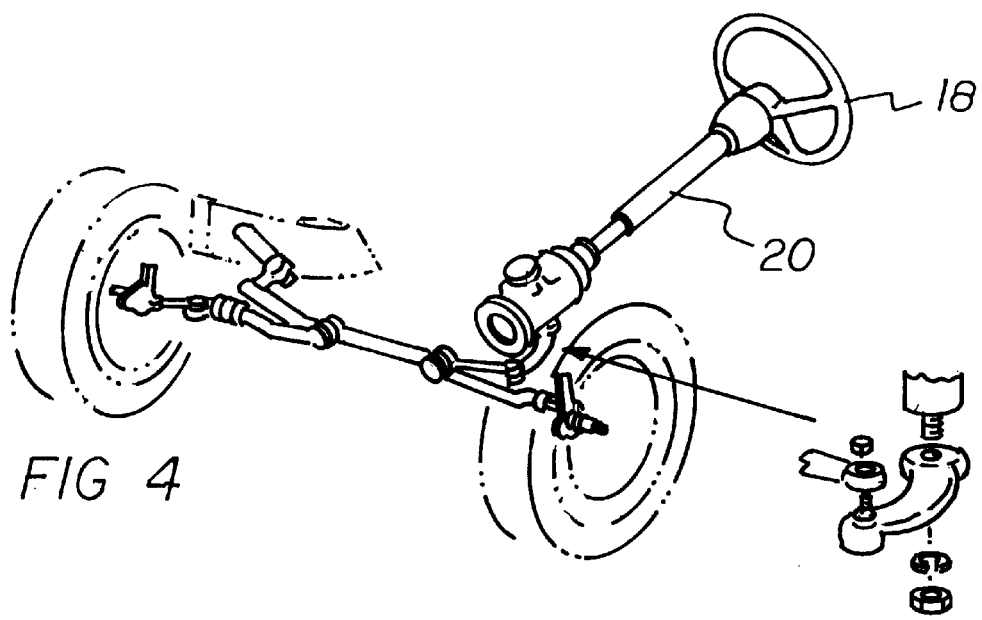
FIG. 4 is an elevational view of a parallelogram type steering system.
Figure 5:
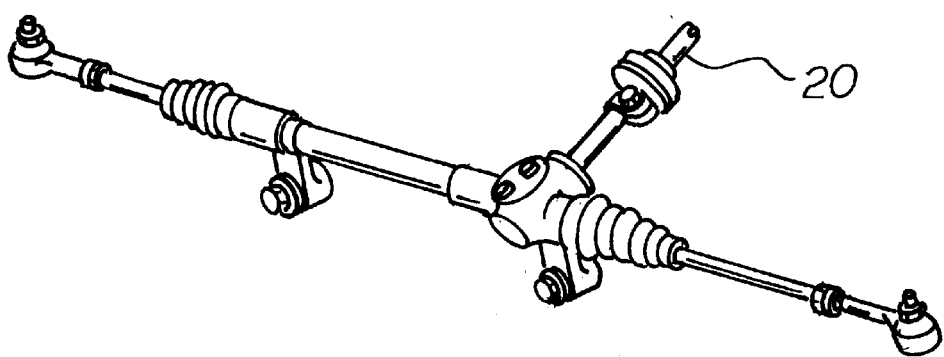
FIG. 5 is a perspective view of a rack and pinion type steering system.
Figure 2:
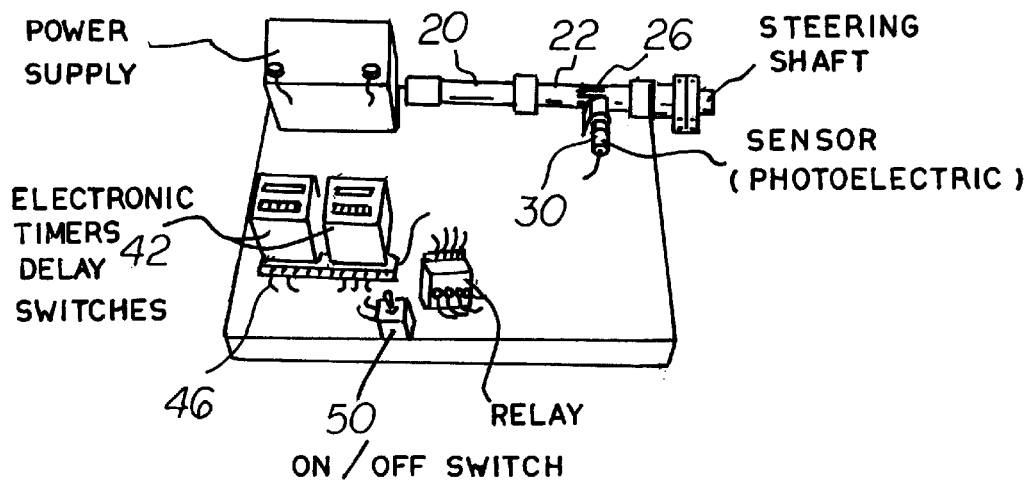
FIG. 2 is a perspective illustration of the electronics utilized in association with the system of the present invention.
Figure 3:
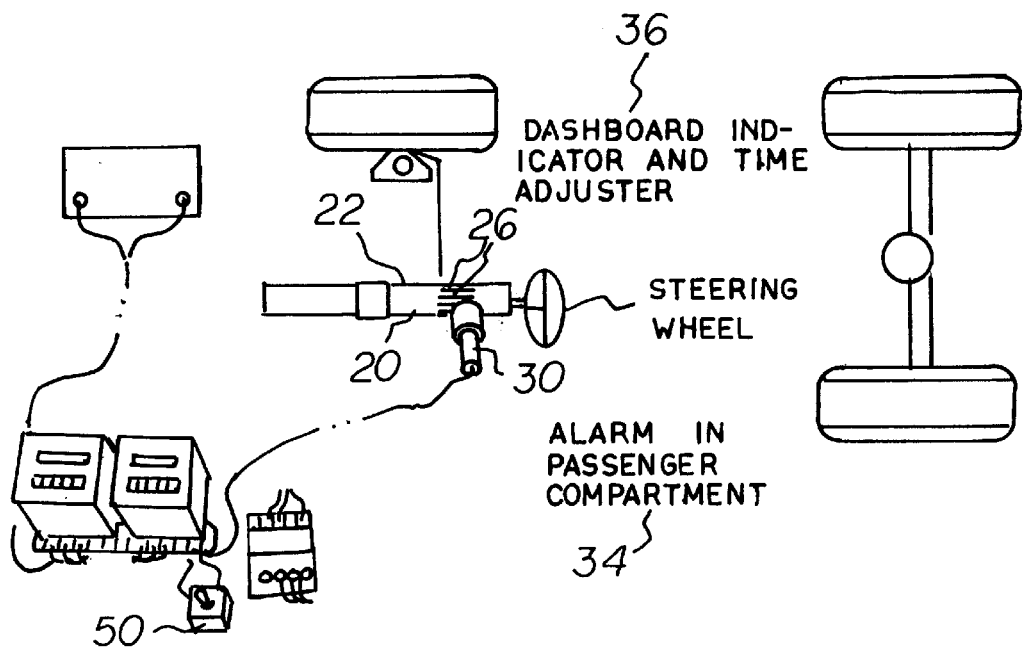
FIG. 3 is a perspective view of the electronics as applied to a vehicle shown in a schematic form.

With reference now to the drawings, and in particular to FIGS. 1 through 5 thereof, the preferred embodiment of the new and improved steering alert system embodying the principles and concepts of the present invention and generally designated by the reference numeral 10 will be described.

The present invention, the new and improved steering alert system is a system 10 comprised of a plurality of components. Such components, in their broadest context, include a vehicle, linear marks on the steering column, a photo-electric sensor, audio and visual alarms, electronic timers, an adjuster, and an on/off switch. Each of the individual components is specifically configured and correlated one with respect to the other so as to attain the desired objectives.

The present invention is a new and improved steering alert system 10 for providing an alarm when a vehicle driver may have fallen asleep or lost attention. The system includes, as a first component, a vehicle 14 having four wheels 16 and a steering wheel 18 with a steering column 20 coupled therebetween. The steering column being formed in a cylindrical configuration with a central axis of rotation and an exterior cylindrical surface 22.

Next provided as a component of the present invention are a plurality of linear marks 26 on the exterior surface of the steering column. The marks are placed parallel with respect to each other and parallel with the axis of the steering column.

A photo-electric sensor 30 is next provided. The sensor is fixedly positioned adjacent to the marks to sense the presence and absence of marks thereadjacent as caused by the rotational movement of the steering column resulting from the rotation of the steering wheel by a driver.

A further component of the system includes audio and visual alarms 34, 36 adapted to be energized for alerting a driver and passenger, if present, when the sensor does not sense movement of the marks and steering column and steering wheel within a predetermined lapsed time.

The next component of the system are electronic timers 40 including delay switches 42 to preclude energizing the alarms if the sensor senses the movement of the steering column and marks in greater than the predetermined lapsed time.

Another component of the system is an adjuster 46 under the control of the driver to change the extent of the predetermined lapsed time in which the sensor will energize the alarm.

The last component of the system includes an on/off switch 50 under the control of the driver to selectively activate and inactivate the system.

The purpose of the present invention is to provide an alarm whenever the steering wheel of a vehicle does not move. This occurs once the vehicle is in operation. The non-movement could very well indicate that the driver is not paying attention to the steering of the vehicle or that the driver has fallen asleep. The present system is not a detector for drowsiness. Instead, it detects driver inattentiveness whether the driver is asleep or awake.

As detailed above, the present invention is composed of a motion sensor unit, an audible alarm, and a visual indicator. The motion sensor is affixed to the steering shaft of the vehicle and is connected to the audible alarm, visual indicator, and timer by electrical conductors. The audible alarm and visual indicator are mounted in the area near the driver's seat to ensure that the driver would be fully aware of the audible and visual alert whenever they are generated.

The present invention is thus as a system which works when the main switch is activated. When there is no movement of the steering shaft within a time set of, preferably, about 1.5 seconds, the light indicator and audible alarm will be activated. Either clockwise or counterclockwise movement of the steering wheel is needed to de-activate the light indicator and audible alarm. The components of the system are installed within the steering system and they depend upon strategic placement and timing.

The function of the present invention is to detect inattentiveness. It is the object of the invention to promote attentiveness to steering. In light of all this, awareness would be achieved. The idea is to steer from point a to point b. This could be achieved because of the tolerance that exists in the steering system. The present invention thus provides a purpose to steer. This will give the driver more attentiveness to the road and promote a positive approach to safety.

The present invention includes components installed adjacent to the steering system. The steering system components are a major part of any vehicle. These components enable the driver to control the wheels and tires of the vehicle. The steering system allows the driver to control the vehicle with the least possible effort. It will also allow the driver to transmit steering commands to the wheels. The driver can do this without feeling road shock in the steering wheel as caused by the wheel passing over rough road surfaces. The present system enables the driver to control the direction of the vehicle.

There are three types of steering systems, the rack and pinion system, the parallelogram system and the relay rod system. Of these three systems, the two most popular are the rack and pinion system and the parallelogram system.

Consider the function of the steering and suspension systems. The suspension system is an assembly used to support weight, absorb/dampen shock and to help maintain tire contact and the proper wheel-to-chassis relationship. It is thus necessary to understand that the vehicle is designed for the steering wheel to transmit steering commands to the steering shaft, then to the steering box, and then to the wheels through other components. In light of this fact, there must not be any steering wheel movement except by the driver, under proper functioning of the steering and suspension systems.

To accurately detect no steering, it would be reasonable to believe that the steering wheel and steering shaft would provide the most accurate means of detection. The latter has been chosen because it is more isolated, it is not as compact as the steering wheel, and it is more economical to install.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A steering alert system for providing an alarm when a vehicle driver may have fallen asleep or lost attention comprising, in combination:

a vehicle having four wheels and a steering wheel with a steering column coupled therebetween, the steering column being cylindrical with a central axis of rotation and an exterior cylidnrical surface;

a plurality of linear marks upon the exterior cylindrical surface of the steering column, the marks being parallel with respect to each other and parallel with the axis of the steering column;

a photo-electric sensor fixedly positioned adjacent to the marks to sense the presence and absence of marks thereadjacent as caused by the rotational movement of the steering column resulting from the rotation of the steering wheel by a driver;

audio and visual alarms adapted to be energized for alerting a driver and passenger, if present, when the sensor does not sense movement of the marks and steering column and steering wheel within a predetermined lapsed time;

electronic timers including delay switches to preclude energizing the alarms if the sensor senses the movement of the steering column and marks in greater than the predetermined lapsed time an adjuster under the control of the driver to change the extent of the predetermined lapsed time in which the sensor will energize the alarm; and an on/off switch under the control of the driver to selectively activate and inactivate the system.

* * * * *